United States Patent [19]

Godsey

[11] 4,028,060

[45] June 7, 1977

[54] METHOD AND APPARATUS FOR THE THERMAL EXTRACTION OF HYDROCARBONS FROM A SOLID MATRIX

[75] Inventor: Charles E. Godsey, Ponca City, Okla.

[73] Assignee: Continental Oil Company, Ponca City, Okla.

[22] Filed: Mar. 26, 1976

[21] Appl. No.: 670,790

[52] U.S. Cl. .................. 23/293 R; 23/230 M; 23/259; 23/267 B; 23/267 C; 260/705

[51] Int. Cl.² .................. B01D 11/02

[58] Field of Search ...... 23/259, 272 R, 272 SC, 23/267 R, 267 C, 270.5 R, 267 B, 293 R, 230 M; 196/14.52; 208/45, 310; 260/705, 666 R, 674 R, 674 SE, 674 SA, 666 SA; 203/49; 202/237

[56] References Cited
UNITED STATES PATENTS

| 2,733,135 | 1/1956 | Huckabay | 23/272 R |
| 3,119,670 | 1/1964 | Mitchell et al. | 23/254 R X |
| 3,313,722 | 4/1967 | Broughton | 208/310 R |
| 3,369,874 | 2/1968 | Wilhelm | 23/272 X |
| 3,397,965 | 8/1968 | Berueffy | 23/254 R X |
| 3,542,525 | 11/1970 | Pigford et al. | 23/272 |

*Primary Examiner*—Morris O. Wolk
*Assistant Examiner*—Arnold Turk
*Attorney, Agent, or Firm*—F. Lindsey Scott

[57] ABSTRACT

An apparatus for extracting organic materials from a sample of a solid matrix containing such organic materials, the apparatus comprising an outer tubular member containing a permeable sample support positioned intermediate the first and second ends of the outer tubular member, and a method for the extraction of such organic materials by applying heat to one end of the outer tubular member while cooling the other end of the outer tubular member. Optionally a solvent is used in the extraction in conjunction with alternate heating and cooling of the ends of the outer tubular member.

15 Claims, 9 Drawing Figures

METHOD AND APPARATUS FOR THE THERMAL EXTRACTION OF HYDROCARBONS FROM A SOLID MATRIX

This application relates to the extraction of organic material from a solid matrix. This invention also relates to the thermal extraction of organic material from a solid matrix. This invention further relates to the thermal extraction of organic materials from a solid matrix by the use of solvent extraction techniques.

A variety of techniques has been used to remove organic compounds from materials such as soils containing hydrocarbons, shale oil samples, coal samples and the like. Such materials generally comprise a solid matrix containing organic materials. Some such techniques have involved the use of high temperatures to pyrolyze the organic compounds, the use of solvents to extract the organic materials and the like. The well-known soxhlet extraction method is well-known to those skilled in the art and comprises the use of solvent which is distilled, condensed and passed through the sample repeatedly. Such techniques have the disadvantage that either large volumes of solvent are required or the temperatures required for pyrolysis have been so high that it is difficult to determine the nature of the hydrocarbon compounds present initially. Accordingly, improved methods have continually been sought whereby organic materials contained in a solid matrix can be recovered from the solid matrix using a minimum amount of solvent, a minimum amount of time, and without the use of extremely high temperatures which pyrolyze the hydrocarbon materials.

It has now been found that such organic materials are readily extracted from a sample portion of a solid matrix material containing such organic materials by the use of an apparatus comprising, an outer tubular member having a first sealable end, a second sealed end, and a permeable sample support means intermediate the first and second ends of the outer tubular member. The apparatus is used in a method whereby a sample is positioned on the permeable sample support means and thereafter the first sealable end of the outer tubular member is sealed. Heat is then applied to one end of the outer tubular member while simultaneously cooling the other end of the outer tubular member. This causes the hydrocarbon material present in the solid matrix to migrate to the cooled end of the outer tubular member in a relative short period of time at temperatures below the pyrolysis temperature of the hydrocarbon material. In a variation of the method a solvent is used and the ends of the outer tubular member are alternately heated and cooled to cause the solvent to pass repeatly through the sample and permeable sample support means thus extracting the organic material from the solid matrix containing the organic material.

In the description of the Figures the same numbers will be used throughout to refer to the same or similiar components.

Figure 1:
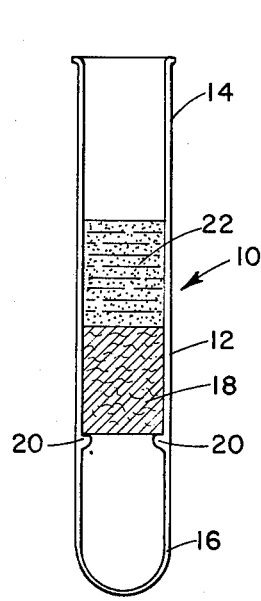
FIG. 1 depicts an embodiment of the apparatus of the present invention.

In FIG. 1 the apparatus 10 of the present invention is shown. Apparatus 10 comprises an outer tubular member 12 having a first sealable end 14 and a second sealed end 16. A permeable sample support means 18 is positioned intermediate first end 14 and second end 16. In many instances it is desirable to have at least one support means, shown as projections 20, to maintain permeable sample support 18 in position. A sample mixture 22 is positioned for analysis on sample support means 18.

Figure 2:
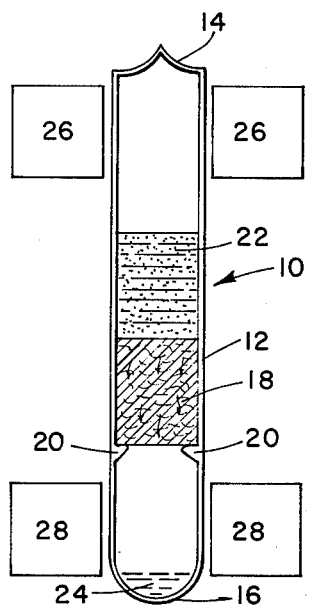
FIG. 2 depicts the apparatus of FIG. 1 wherein the first sealable end has been sealed and the heaters and coolers placed in position.

FIG. 2 shows the apparatus of FIG. 1 ready for use in a test method to be described hereinafter. First end 14 has been sealed and a heating means 26 and a cooling means 28 have been placed adjacent first end 14 and second end 16 respectively.

In the use of the apparatus shown in FIG. 1 and FIG. 2 for the extraction of organic materials from a sample portion of a solid matrix containing the organic materials, the sample is mixed with an absorbent which absorbs water and retains the water at temperatures up to and in excess of 500° C. to form sample mixture 22. One such absorbent is calcium oxide, although other absorbents may be used to so retain water. The sample and absorbent are mixed and placed in apparatus 10 and thereafter first sealable end 15 is sealed. First end 14 is then heated to a temperature in the vicinity of about 500° C. while second end 16 is cooled to a temperature below about 500° C. It is desirable that the heating and cooling be continued until the organic material 24 has collected in second end 16 as shown in FIG. 2. The heating can be gradual beginning at temperaturess of about 200° C. and increasing to 500° C. in a period of time from about 20 minutes to about 2 hours although it is preferred that the time be from about 45 minutes to 75 minutes. Desirably, the temperature is below about 500° C. until the migration of organic material into second end 16 is substantially complete. The temperature can then be increased to about 600° C. if desired. The cooling can be at any desired temperature although it is believed that most desirable results will be obtained when the temperature of second end 16 is maintained at from about 10° to about 50° C. Apparatus 10 is adapted to be positioned in a pulsed nuclear magnetic resonance analysis device after collection of organic material 24 in second end 16 for determination of the amount and type of organic material.

It is pointed out that the extraction of the organic material as described above requires no solvent and thus there is no interference from hydrocarbon impurities in the solvent. Further the extraction requires only one to two hours and multiple samples can be run simultaneously.

Apparatus 10 is relatively inexpensive and can be readily discarded thus eliminating the need for cleanup and the like. The use of the water-absorbing material results in the removal of the water from the organic material and thus further increases the accuracy since interferences in the test method caused by water are eliminated. Further the organic material is concentrated at the center of the receiver coil which greatly improves the signal-to-noise ratio. Of course the orgnic material can also be analyzed by other methods such as infrared, ultraviolet, or fluorescence methods. Outer tubular member 12 can also be broken open to collect the extracted hydrocarbons for analysis by other suitable methods such as nuclear magnetic resonance, infrared, mass spectrometry, gas chromatography or the like.

The method is useful in conjection with soil samples, shale oil samples, coal samples or the like, however, it has been found that the most desirable results are obtained when the sample contains minimal quantities of hydrocarbons lighter than about $C_4$. Such hydrocarbons can be analyzed, however, it is clear from the test method that a much stronger outer tubular member would be required since such hydrocarbons generate extremely high pressures at the temperatures involved. It is accordingly preferred that the samples used in the method of the present invention contain substantially no hydrocarbon materials lighter than about $C_4$.

Figure 3:
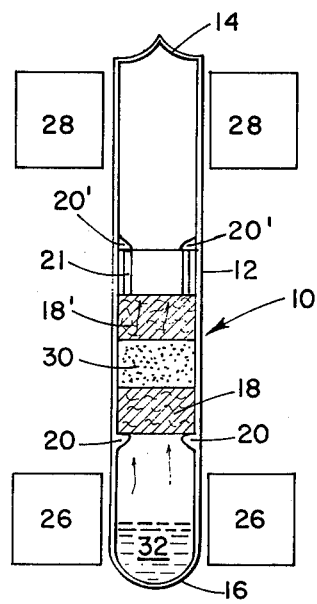
FIG. 3 shows the apparatus of the present invention for use with a solvent.

In FIG. 3 apparatus 10 of the present invention is shown as modified for use in the solvent extraction of organic materials from a solid matrix. A sample 30 is placed above permeable sample support 18 with a solvent 32, being positioned in second end 16 of outer tubular member 12. First end 14 of outer tubular member 12 is sealed. Desirably a sample retaining means 18' is used to maintain sample 30 in position. Sample retaining means 18' is of materials similar to those used as permeable sample support 18 and desirably is the same material. Desirably sample retaining means 18' is retained in position by at least one restraining means 20' between retaining means 18' and first end 14, such restraining means are shown as projections 20'. Projections 20' are readily produced by heating an area of outer tubular member 12 to its softening point and then deforming a portion of the wall of outer tubular member 12 into projections 20'. Projections 20 may be formed in a similar manner. Desirably a spacer means 21 is used between retaining means 18' and projection 20' so that the high temperatures necessary to soften outer tubular member 12 to form projection 20' are not adjacent sample 30. Spacer 21 is shown as a section of a glass tube.

Figure 4:
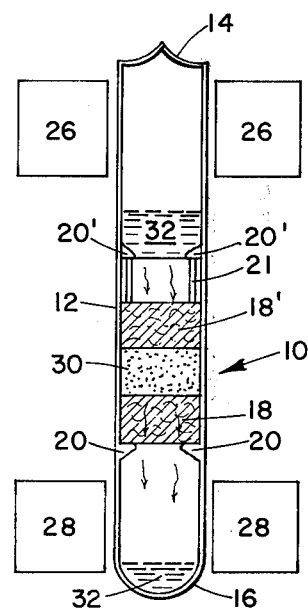
FIG. 4 shows the apparatus of FIG. 3 in use.

In the use of the apparatus of FIG. 3, second end 16 of outer tubular member 12 is heated by heater 26, while first end 14 of outer tubular member 12 is cooled by cooler 28. This causes solvent 32 to vaporize and pass upwardly through permeable sample support 18, sample 30 and sample retaining means 18' and condense in first end 14 of outer tubular member 12. In FIG. 4 a portion of solvent 32 has been condensed in first end 14 of outer tubular member 12 and heater 26 and cooler 28 have been switched so that first end 14 of outer tubular member 12 is heated while second end 16 of outer tubular member 12 is cooled. Such causes solvent 32 in first end 14 to vaporize and create pressure which urges solvent 32 through sample retaining means 18' sample 30 and permeable sample support 18 into second end 16. Heater 26 and cooler 28 are then reversed and the solvent is again vaporized upwardly through permeable sample support 18, sample 30 and sample retaining means 18' into first end 14 and the like. The heating and cooling is then repeated sequentially to result in passing distilled solvent and solvent vapor repeatedly through sample 30 until the solvent passing through permeable sample support 18 is substantially clear indicating that substantially all of the organic material has been removed from sample 30.

The heating of the ends of outer tubular member 12 is at a temperature of up about 150° C. above the boiling temperature of the solvent chosen. It is desirable that temperatures of less than about 100° C. above the boiling temperature of the solvent be used. Preferably the temperature is equal to approximately double the boiling temperature of the solvent. Obviously, considerable variations in the temperatures used are suitable. The cooling can be conducted by means known to those skilled in the art, although it has been found that in many instances no cooling is necessary since air cooling is sufficient. The choice of a particular means for cooling is left to those skilled in the art although, as noted, in many instances air cooling is sufficient.

The use of the present apparatus and method results in significant advantages over methods used heretofore. For instance, the present method requires only about 1 ml. of solvent per gram of sample compared to ratios varying from 10 to 100 ml. of solvent per gram of sample with methods used heretofore. The present method requires approximately 1 to 2 hours as compared to times of up to 8 hours by methods used previously. The equipment used is relatively inexpensive and the sample tubes may be discarded. Numerous samples can be run simultaneously. The use of the solvent for extraction is rendered more effective by virtue of the fact that the solvent is a temperature in excess of its boiling point when it contacts the sample.

Obviously, the organic materials contained in the solvent 32 can be analyzed by pulsed nuclear magnetic resonance methods, infrared, ultraviolet, and fluorescence methods and the like. Of course, suitable allowance must be made for the presence of the solvent.

The tubes can also be broken open to collect the extracted hydrocarbons for analysis by other suitable methods such as nuclear magnetic resonance, infrared, mass spectrometry, gas chromatography and the like. Such test methods are known to those skilled in the art and need not be discussed further.

Figure 5:
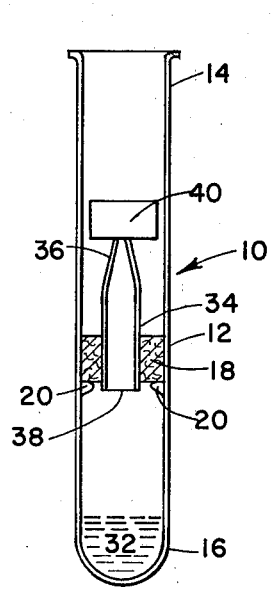
FIG. 5 shows a variation of the apparatus of FIG. 3.
Figure 6:
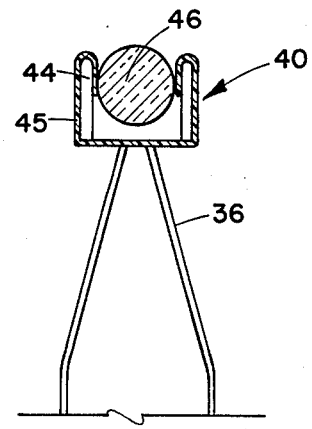
FIG. 6 is a cross-sectional view of the valve shown in FIG. 5.

FIG. 5 shows a variation of the apparatus of FIG. 3 wherein an inner tubular member 34 is positioned through permeable sample support 18. Inner tubular member 34 has a first end 38 and a second end 36 with a valve 40 being positioned on first end 36. Valve 40 is shown in detail in FIG. 6.

Valve 40, as shown, comprises a teflon tape 45 stretched over a glass ring 44 and secured by a ball 46 positioned inside ring 44. Fluid flows through inner member 34 by urging valve 40 upward to permit passage of fluid between second end 36 and teflon tape 45. Passage of fluid in the opposite direction is prevented. Clearly, various types of one-way valves can be used such as the valve shown, ball valves and the like.

Figure 7:
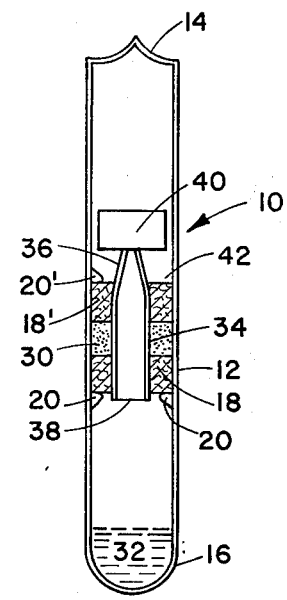
FIG. 7 shows the apparatus of FIG. 5 with the sample in position and both ends sealed.

FIG. 7 shows the apparatus of FIG. 5 with first end 14 of outer tubular member 12 sealed and a solvent 32 positioned in second end 16 of outer tubular member 12. In FIG. 5 permeable sample support 18 is shown as a filter filling the space between inner tubular member 34 and the inside of outer tubular member 12. In FIG. 7 a sample 30 is shown positioned between permeable sample support member 18 and inner tubular member 34 and retained in position by sample retaining means 18' positioned as shown around inner tubular member 34 and over sample 30. Restraining means such as projection 20' may be used if desired. Obviously, sample 30 can be secured in position by a variety of means known to those skilled in the art. Inner tubular member 34 extends through permeable sample support 18 for a distance toward first end 14, as shown, thus defining a space between the outside of inner tubular means 34 and the inside of outer tubular means 12. Clearly the sample 30 could be positioned between the top of sample support 18 and valve 40 without retaining means, such as retaining means 18' although it is believed that in most instances it will be desirable to retain sample 30 in some manner so that light components of sample 30 do not float or the like. In those instances wherein filter paper is used as permeable sample support means 18, a portion of the sample paper can be folded over sample 30, and in those instances wherein other materials are used as a sample support 18, a second packing material which is also permeable can be used as sample retaining means 18' or the like. Such variations are considered obvious to those skilled in the art and have not been shown in detail.

Figure 8:
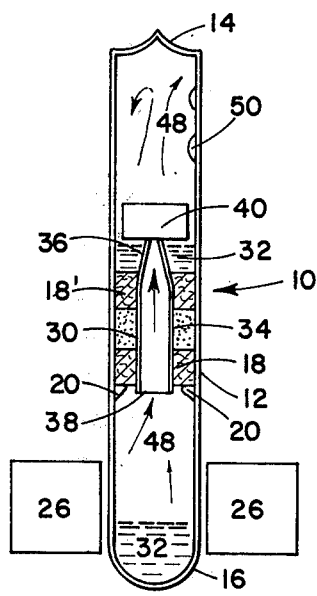
FIG. 8 shows the apparatus of FIG. 5 ready for use in the extraction procedure; and, FIG. 9 shows the apparatus of FIG. 5 in use in the second step in the extraction procedure.
Figure 9:
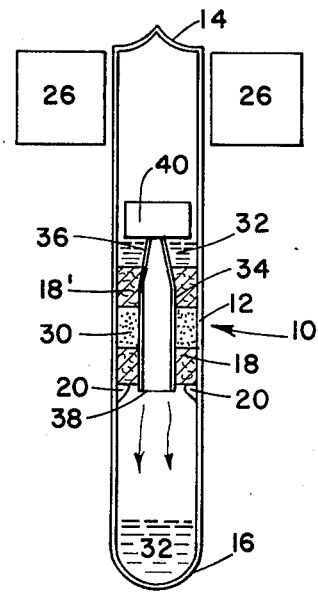

In the use of the apparatus of FIG. 5 as shown in FIG. 8, heater 26 is placed near second end 16 and heat is applied. Solvent 32 vaporizes and passes upwardly through inner tubular member 34 and valve 40 and condenses in first end 14 (shown as droplets 50). Solvent accummulates above permeable sample retaining means 18', since the vapor pressure below sample support 18 is greater than the pressure in first end 14, until a substantial amount of solvent has been vaporized into first end 14. Heater 26 is then moved to first end 14 where solvent is vaporized thus causing liquid solvent to be forced through sample retaining means 18', sample 30 and sample support means 18 and back into second end 16. When substantially all the solvent has been forced back into second end 16, heater 26 is moved back to second end 16 and the sequence is repeated. The sequence is repeated as required to remove substantially all the organic material from sample 30. Clearly the effectiveness of the solvent treatment can be determined by observing the color of the solvent returning throuh permeable sample support 18 or the like.

The use of the apparatus of FIG. 5 is advantageous when small samples are to be analyzed or the like. The valve used is desirably a trap valve since it permits the flow of solvent vapor toward first end 14 when second end 16 is heated and effectively prevents the flow of solvent back through inner tubular member 34 toward second end 16 when first end 14 is heated.

The analysis of the organic material extracted in the foregoing method is as described in conjunction with the method useful with the apparatus of FIG. 3, since the solvents used are similiar. The operating temperatures and conditions are also similar.

In the apparatus of the present invention it is desirable that the apparatus be formed of glass. The glass must be selected from those types of glass which are thermally stable at the temperature ranges indicated and which have adequate structural strength to withstand the pressures generated. Particularly desirable results have been achieved when borosilicate glass was used.

The solvents used in the method of the present invention are selected from those solvents which are effective solvents for the particular organic materials involved and which are readily vaporized and condensed at the operating conditions. Some suitable solvents are: carbon tetrachloride, carbon disulfide, chloroform, benzene, methanol, dimethylsulfoxide, pyridine, trifluoroacetic acid, methanesulfonic acid, mixtures thereof and the like. Particularly desirable results have been achieved wherein chloroform or methanol-benzene mixtures are used. Deuterized solvents such as deuterized methanol, deuterochloroform and mixtures thereof have been found to be particularly suitable solvents for use with pulsed nuclear magnetic resonance test methods since these solvents contain no hydrogen and as a result present substantially no interference with the test method. Toxic solvents may also be used in the present test method since no vapors escape from the test apparatus during the extraction process.

The permeable sample support 18 and sample retaining means 18' are chosen from those permeable materials which are suitably stable at the temperatures involved. For instance in the test method described in conjection with FIGS. 1 and 2, glass fiber or the like has been found suitable although substantially any porous material which is stable at the temperatures involved is suitable. In many instances it is desirable that a support 20 be provided to maintain permeable sample support 18 in place. Such a support means is shown as projections 20 in the Figures. The primary function of the permeable sample support 18 is not filtration although it also functions as a filter, but rather the maintenance of the sample in a position where it is readily contacted by solvent, solvent vapors and the like. So long as the permeable sample support is permeable to vapors of the organic material and mixtures of the organic material and solvent such is suitable. For instance, in the method described in conjunction with FIGS. 1 and 2, permeable sample support 18 is permeable to vapors of the organic material. In conjunction with the variations of the method discussed with reference to FIGS. 2 thru 9, the permeable sample support functions as a filter, as well, as a support means. In this instance the solvent flows through the permeable sample support and it is desirable that the permeable sample support function as a filter. Some suitable materials are glass fiber, filter paper, and the like. It is believed clear that the choice of a suitable material for use as a permeable sample support is well within the skill of those in the art and that further discussion is not necessary.

Having thus described certain preferred embodiments of the present invention, it is pointed out that the embodiments discussed are illustrative rather than limiting in nature and it is anticipated that many variations and modifications within the scope of the present invention may be considered obvious and desirable by those skilled in the art, upon a review of the foregoing description of preferred embodiments.

Having thus described the invention I claim:

1. An apparatus for extracting organic material from a sample portion of a solid matrix containing said organic material, said apparatus comprising:
   a. an outer tubular member having a first sealable end and a second sealed end;
   b. a permeable sample support means in said outer tubular member intermediate said ends;
   c. and inner tubular member extending through said sample support means and having a first end positioned between said sample support means and said first sealable end of said outer tubular member; and
   d. a valve means above said first end of said inner tubular member adapted to permit flow of fluids through said inner tubular member and out said first end of said inner tubular member and to prevent flow of fluids through said inner tubular member from said first end of said inner tubular member to said sealed end of said outer tubular member.

2. The apparatus of claim 1 wherein said valve is a trap valve.

3. The apparatus of claim 1 wherein said first end of said outer tubular member is sealed.

4. The apparatus of claim 1 wherein said outer tubular member is glass.

5. The apparatus of claim 4 wherein said glass is borosilicate glass.

6. The apparatus of claim 5 wherein said outer tubular member includes means for maintaining said support means in a desired location.

7. The apparatus of claim 6 wherein said support means comprises a filter means.

8. A method for extracting organic material from a sample portion of a solid matrix containing said organic material, said method comprising;
   a. mixing said sample with a water absorbing material to form a sample mixture;
   b. positioning said sample mixture in an apparatus comprising;
      1. an outer tubular member having a first sealable end and a second sealed end; and
      2. a permeable sample support means intermediate said first end and said second end of said outer tubular member
      said sample mixture being supported by said support means so that at least a portion of said support means is between said sample mixture and said second end
   c. sealing said first sealable end of said outer tubular member;
   d. simultaneously heating said first end of said outer tubular member and cooling said second end of said outer tubular member.

9. The method of claim 8 wherein said outer tubular member is glass.

10. The method of claim 9 wherein said first end is heated to a temperature of about 550° C. for a time sufficient to cause said organic material to accumulate in said second end.

11. The method of claim 10 wherein said water absorbing material is calcium oxide.

12. A method for solvent-extracting organic material from a sample portion of a solid matrix containing said organic material, said method comprising
   a. positioning said sample in an apparatus comprising
      1. an outer tubular member having a first sealable end and a second sealed end; and,
      2. a permeable sample support means intermediate said first end and said second end of said outer tubular member said sample being suported by said support means so that at least a portion of said support means is between said sample and said second end;
   b. positioning an effective amount of suitable solvent in said apparatus;
   c. sealing said first sealable end of said outer tubular member;
   d. heating said second end of said tubular member to vaporize said solvent and simultaneously cooling said first end of said tubular member to condense said solvent in said first end of said outer tubular member;
   e. cooling said second end of said tubular member and simultaneously heating said first end of said outer tubular member to vaporize a portion of said solvent and cause liquid solvent and solvent vapor to flow through said sample and said permeable sample support means to said second end of said outer tubular member; and,
   f. sequentially repeating steps (c) and (d).

13. The method of claim 12 wherein said permeable sample support means comprises a filter means having a positioned therethrough an inner tubular member having a first and a second end, said first end being positioned between said support means and said first sealable end of said outer tubular member, said inner tubular member including a valve means positioned on said first end to permit flow of fluids through said inner member from said second end to said first end of said inner tubular member and prevent flow of fluids through said inner tubular member from said first end to said second end of said inner tubular member.

14. The method of claim 12 wherein said outer tubular member is glass.

15. The method of claim 14 wherein said tubular member is borosilicate glass.

* * * * *